(12) United States Patent
Suenaga et al.

(10) Patent No.: US 7,559,192 B2
(45) Date of Patent: Jul. 14, 2009

(54) ENGINE CONTROL APPARATUS

(75) Inventors: Motoyasu Suenaga, Tokyo (JP); Kouji Wada, Tokyo (JP); Masakazu Miyasako, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 79 days.

(21) Appl. No.: 11/507,460

(22) Filed: Aug. 22, 2006

(65) Prior Publication Data
US 2007/0227122 A1    Oct. 4, 2007

(30) Foreign Application Priority Data
Mar. 29, 2006   (JP) .............................. 2006-091423

(51) Int. Cl.
*F01N 3/00*   (2006.01)
(52) U.S. Cl. .............................. 60/277; 60/274; 60/285; 123/406.13; 123/406.14; 123/406.27
(58) Field of Classification Search .................... 60/277, 60/285, 286, 274; 123/406.13, 406.14, 406.26, 123/406.27
See application file for complete search history.

(56) References Cited
U.S. PATENT DOCUMENTS
5,728,941 A * 3/1998 Yamamoto et al. ............ 73/116
5,951,618 A * 9/1999 Fukuchi et al. .............. 701/110
6,023,964 A * 2/2000 Kanbara et al. ............. 73/117.3
6,098,013 A * 8/2000 Mueller ....................... 701/112
6,185,928 B1 * 2/2001 Wallerand et al. .............. 60/274
6,314,724 B1 * 11/2001 Kakuyama et al. ............ 60/285

FOREIGN PATENT DOCUMENTS
JP          03-021541 U     3/1991
JP          2001-020792 A   1/2001
JP          2004-232487 A   8/2004
JP          2005-337188 A  12/2005

* cited by examiner

*Primary Examiner*—Binh Q. Tran
(74) *Attorney, Agent, or Firm*—Sughrue Mion, PLLC

(57) ABSTRACT

Provided is an engine control apparatus equipped with a three-way catalyst for purifying exhaust gas, a unit for calculating an operational state based on outputs from various sensors, a unit for calculating a fuel injection amount, a unit for driving an injector, a unit for calculating an actual misfire ratio, a catalyst damage determining misfire ratio calculating unit for calculating a misfire determining ratio, a catalyst damaging misfire determining unit for cutting off a supply of fuel when it is determined that a damage-causing misfire state has arisen, a unit for storing an actual misfire ratio at a time when it is determined that the damage-causing misfire state has arisen, and a unit for making a recovery from the cutoff of the fuel supply when the misfire determining ratio has become larger than the misfire ratio at the time of the determination that the damage-causing misfire state has arisen.

19 Claims, 14 Drawing Sheets

ENGINE CONTROL APPARATUS

BACKGROUND OF THE INVENTION

1. Field of the Invention

The present invention relates to an engine control apparatus having a function of cutting off a supply of fuel to a misfired one of cylinders of an engine when a rise in temperature of exhaust gas resulting from a misfire of the engine is assumed to damage a catalyst.

2. Description of the Related Art

A conventional engine control apparatus is equipped with a fuel injection amount setting means for setting a fuel injection amount in accordance with an operational state of an engine, an exhaust gas temperature abnormal rise detecting means for detecting an abnormal rise in temperature of exhaust gas, a misfired cylinder determining means for determining a misfired cylinder when the exhaust gas temperature abnormal rise detecting means has detected an abnormal rise in the temperature of exhaust gas, and a fuel supply cutoff means for cutting off a supply of fuel to the misfired cylinder determined by the misfired cylinder determining means.

When the temperature of exhaust gas has exceeded a first set temperature set in advance in accordance with an engine rotational speed, the exhaust gas temperature abnormal rise detecting means determines that the temperature of exhaust gas has risen abnormally, and cuts off the supply of fuel. At this moment, the fuel injection amount setting means sets the fuel injection amount to a base fuel injection amount, thereby prohibiting the fuel injection amount from being enriched.

The fuel supply cutoff means cancels the cutoff of the fuel supply (hereinafter referred to as "makes a recovery from the cutoff of fuel supply") when the temperature of exhaust gas has become equal to or lower than a second set temperature set in advance (e.g., see JP 2001-20792 A).

In the aforementioned conventional apparatus, the supply of fuel is cut off on a condition regarding the temperature of exhaust gas, so a recovery from the cutoff of the fuel supply cannot be made in consideration of the operational state of the engine.

Thus, the recovery from the cutoff of the fuel supply is made in a high load region which causes damage to a catalyst, so a large amount of unburnt fuel may be allowed to flow into the catalyst.

Even when a misfire occurs due to a transient cause such as insufficient combustion at low temperatures, the cutoff of the fuel supply is continued until the temperature of the exhaust gas becomes equal to or lower than the second set temperature set in advance.

In the conventional engine control apparatus, a large amount of unburnt fuel maybe allowed to flow into the catalyst. Therefore, the temperature of the catalyst rises abruptly to reach an abnormally high temperature, so there is caused a problem in that the catalyst is damaged.

A temperature sensor also needs to be provided to detect a temperature of the exhaust gas, so there is also caused a problem of a rise in cost.

Even when a misfire occurs due to a transient cause, the cutoff of the fuel supply is continued until the temperature of the exhaust gas becomes equal to or lower than the second set temperature set in advance. Therefore, in the case of a four-cylinder engine, the engine is operated with only three cylinders being supplied with fuel. As a result, there is also caused a problem in that a desired output cannot be obtained.

SUMMARY OF THE INVENTION

The present invention has been made to solve the foregoing problems, and it is therefore an object of the invention to provide an engine control apparatus capable of reliably protecting a catalyst from being damaged, ensuring an engine of its original output performance again, and restoring a power performance thereof without entailing any rise in cost.

An engine control apparatus according to the present invention includes: a catalyst provided in an exhaust system of an engine, for purifying exhaust gas; various sensors provided in the engine; an operational state calculating means for calculating an operational state including at least an engine rotational speed and a filling efficiency based on outputs from the sensors; a fuel injection amount calculating means for calculating a fuel injection amount of the engine based on the operational state; an injector driving means for driving an injector for injecting fuel into an arbitrary one of cylinders in accordance with the fuel injection amount; an actual misfire ratio calculating means for making a determination on presence/absence of a misfire and calculating an actual misfire ratio based on the outputs from the sensors; a catalyst damage determining misfire ratio calculating means for calculating a misfire determining ratio for making a determination on a damage-causing misfire state in which the catalyst is assumed to be damaged, based on the operational state; a catalyst damaging misfire determining means for comparing the actual misfire ratio with the misfire determining ratio and cutting off a supply of fuel to a misfired one of the cylinders when it is determined that the damage-causing misfire state of the catalyst has arisen; a misfire ratio storing means for storing the actual misfire ratio at a time when it is determined that the damage-causing misfire state has arisen as a misfire ratio at a time of a determination that the damage-causing misfire state has arisen; and a fuel supply cutoff recovery means for outputting a drive permitting signal to the injector driving means to make a recovery from cutoff of the fuel supply when a predetermined condition is satisfied, and the fuel supply cutoff recovery means determines that the predetermined condition is satisfied when the misfire determining ratio has become larger than the misfire ratio at the time of the determination that the damage-causing misfire state has arisen.

In the engine control apparatus according to the present invention, the catalyst damaging misfire determining means compares the actual misfire ratio with the misfire determining ratio, and cuts off the supply of fuel to a misfired one of the cylinders when it is determined that a misfire state causing damage to the catalyst has arisen.

When the misfire determining ratio has become larger than the misfire ratio at the time of the determination that the damage-causing misfire state has arisen, the fuel supply cutoff recovery means outputs the drive permitting signal to the injector driving means to make the recovery from the cutoff of the fuel supply.

Thus, the recovery from the cutoff of the fuel supply can be made within a region causing no damage to the catalyst based on the operational state of the engine. Therefore, it is possible to reliably protect the catalyst from being damaged, ensure the engine of its original output performance again, and restore the power performance thereof without entailing any rise in cost.

DETAILED DESCRIPTION OF THE PREFERRED EMBODIMENTS

Respective embodiments of the present invention will be described hereinafter with reference to the drawings, in which like or corresponding members and portions are denoted by like reference symbols.

First Embodiment

Figure 1:
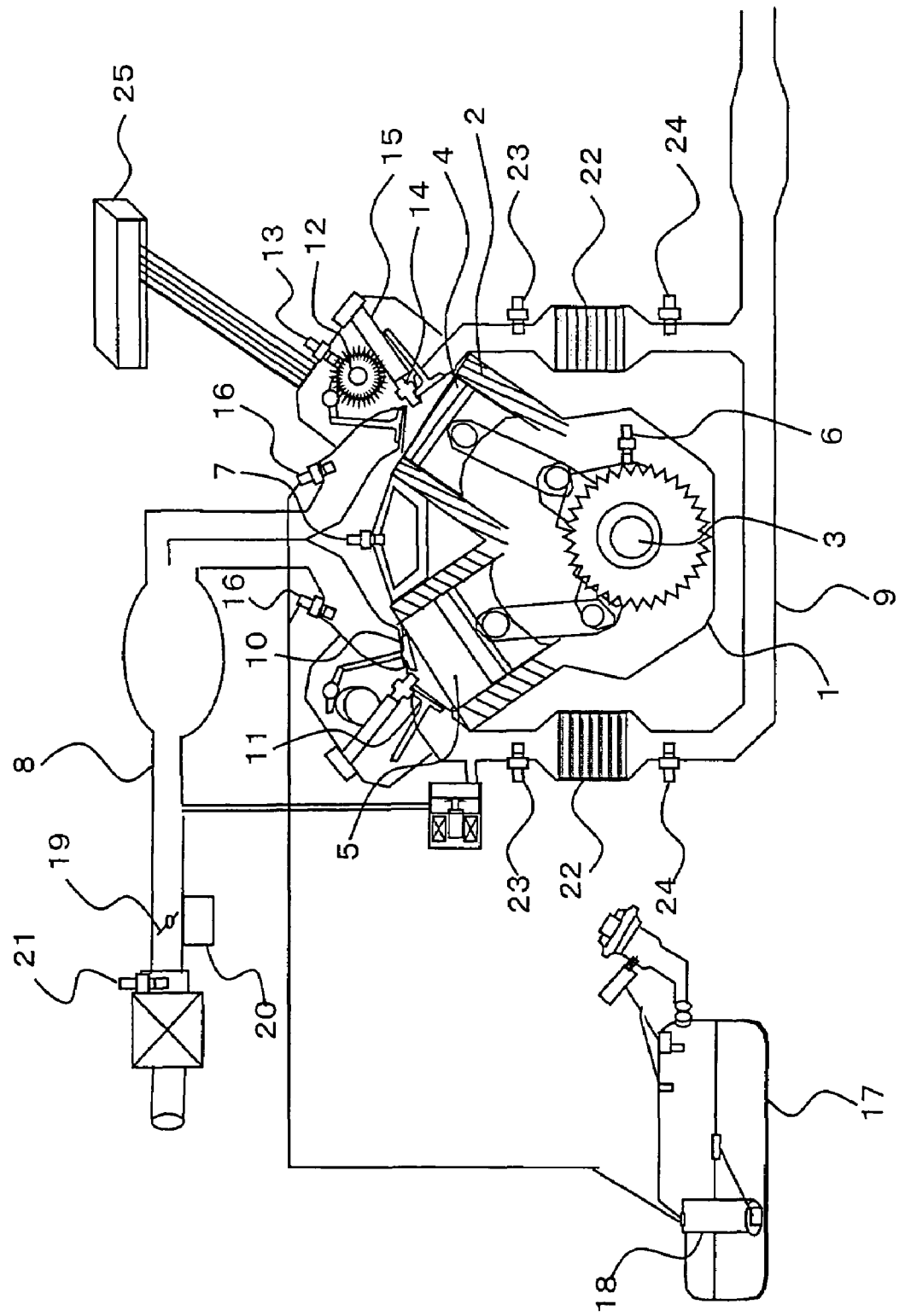
FIG. 1 is a schematic diagram showing an entire system including an engine control apparatus according to a first embodiment of the present invention.

FIG. 1 is a schematic diagram showing an entire system including an engine control apparatus according to the first embodiment of the present invention. Although a generally employed engine 1 is provided with a plurality of cylinders 2, two of them will be described in the following embodiments of the present invention.

Referring to FIG. 1, combustion chambers 5, into which a mixture of fuel and air is sucked to burn, are formed in the engine 1. Each of the combustion chambers 5 is defined by a corresponding one of the tubular cylinders 2 and a corresponding one of pistons 4 connected to a crankshaft 3.

Each of the pistons 4 is reciprocatively provided in the axial direction of a corresponding one of the cylinders 2. The crankshaft 3 is provided with a crank angle sensor (various sensors) 6, which detects a crank angle from a protrusion of a crank plate rotating together with the crankshaft 3 and outputs a crank signal. The cylinders 2 are provided with a coolant temperature sensor (a coolant temperature measuring means) 7, which measures a temperature of coolant for cooling the engine 1 and outputs a coolant temperature signal.

An intake pipe 8 for introducing air into the cylinders 2 and an exhaust pipe 9 for discharging exhaust gas generated as a result of combustion of the mixture in the combustion chambers 5 are connected to the cylinders 2.

Each of the cylinders 2 is fitted with an intake valve 10 for opening/closing a border between a corresponding one of the combustion chambers 5 and the intake pipe 8, and an exhaust valve 11 for opening/closing a border between a corresponding one of the combustion chambers 5 and the exhaust pipe 9. A cam shaft 12 for opening/closing the intake valve 10 and the exhaust valve 11 is provided with a cam angle sensor (various sensors) 13 for detecting a cam angle and outputting a cam signal.

A top portion of each of the cylinders 2 is provided with a spark plug 14 for igniting the mixture supplied to a corresponding one of the combustion chambers 5, and an ignition coil 15 for generating a current for sending off a spark to the spark plug 14.

An injector 16 for injecting fuel into each of the combustion chambers 5 is installed on the downstream side of the intake pipe 8 and close to a corresponding one of intake valves 10. Fuel is supplied from a fuel tank 17 to the injector 16 via a fuel pump 18.

A throttle valve 19 for adjusting an intake air amount and a throttle sensor (various sensors) 20 for detecting an opening degree of the throttle valve 19 and outputting a throttle signal are installed on the upstream side of the intake pipe 8. An airflow sensor (an intake air amount measuring means) 21 for measuring the intake air amount and outputting an airflow sensor signal is provided on the upstream side of the throttle valve 19.

A three-way catalyst (a catalyst) 22 for purifying harmful substances in exhaust gas, namely, hydrocarbons (HC), nitrogen oxides (NOx), and carbon monoxide (CO) is provided on the downstream side of the exhaust pipe 9.

A first $O_2$ sensor 23 for detecting an air-fuel ratio of exhaust gas on the upstream side of the three-way catalyst 22 is provided upstream thereof. A second $O_2$ sensor 24 for detecting an air-fuel ratio of exhaust gas that has passed through the three-way catalyst 22 is provided on the downstream side thereof. The first $O_2$ sensor 23 and the second $O_2$ sensor 24 are used to perform feedback control of the air-fuel ratio.

Calculations of control amounts, outputs of control signals, and engine control such as fuel injection control including air-fuel ratio control, ignition timing control, idling rotational speed control, intake air control, and the like for a group of actuators such as the spark plug 14, the injector 16, the throttle valve 19, and the like are performed by an electronic control unit (an ECU) 25 constituting an essential part of the engine control apparatus.

Figure 2:
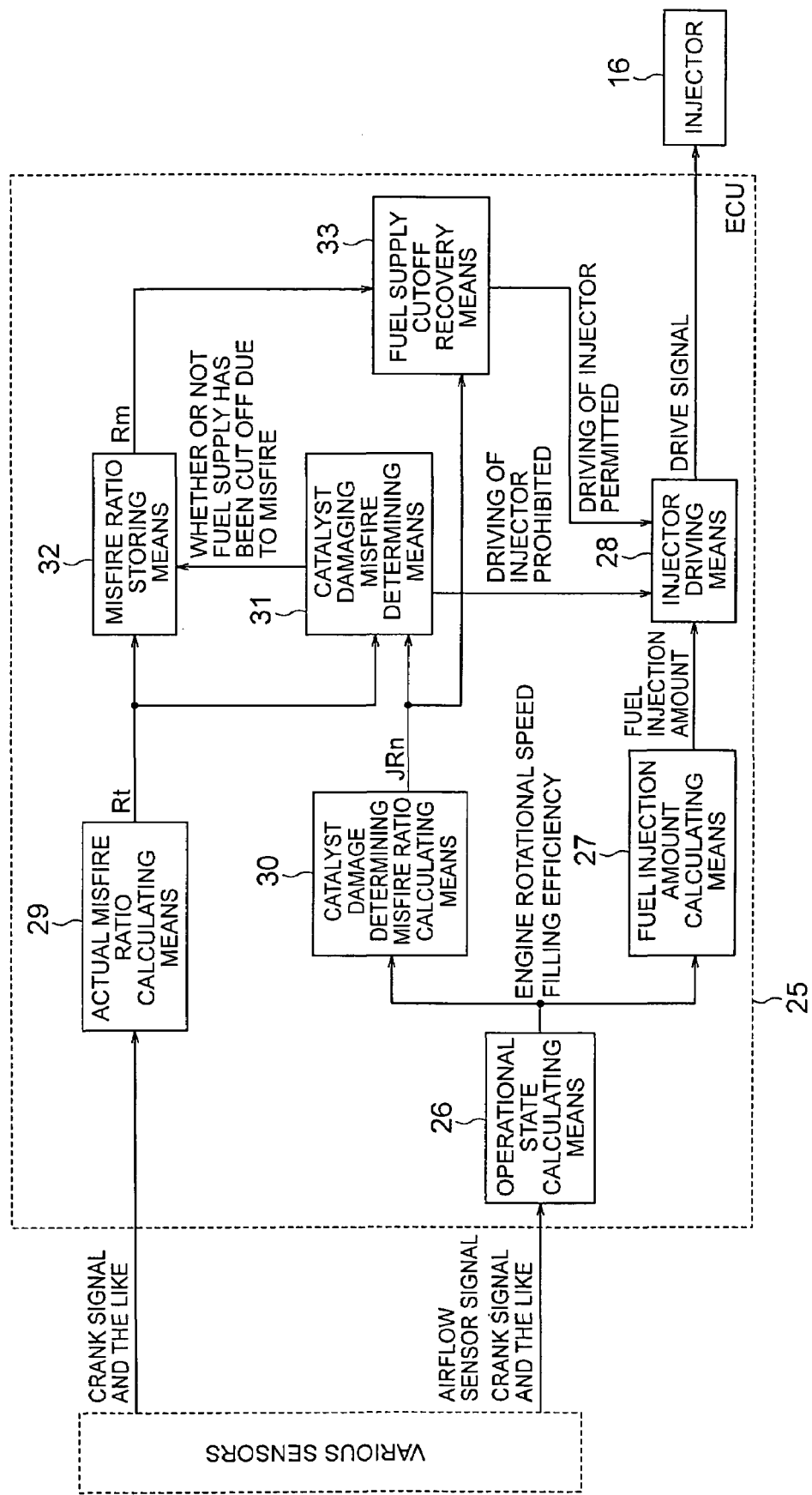
FIG. 2 is a block diagram showing an ECU of the engine control apparatus according to the first embodiment of the present invention.

FIG. 2 is a block diagram showing the ECU 25 of the engine control apparatus according to the first embodiment of the present invention.

Referring to FIG. 2, the ECU 25 is equipped with an operational state calculating means 26, a fuel injection amount calculating means 27, an injector driving means 28, an actual misfire ratio calculating means 29, a catalyst damage determining misfire ratio calculating means 30, a catalyst damaging misfire determining means 31, a misfire ratio storing means 32, and a fuel supply cutoff recovery means 33.

The ECU 25 is constructed of a microcomputer (not shown) having a CPU for performing calculation processings, a ROM for storing program data and fixed value data, and a RAM which is rewritten sequentially by updating the stored data. Respective blocks constituting the ECU 25 are stored in the ROM as pieces of software.

The operational state calculating means 26 calculates an operational state including at least an engine rotational speed and a filling efficiency based on respective signals output from various sensors (the crank angle sensor 6, the coolant temperature sensor 7, the cam angle sensor 13, the throttle sensor 20, the airflow sensor 21, the first $O_2$ sensor 23, and the second $O_2$ sensor 24) provided in the engine 1.

The fuel injection amount calculating means 27 calculates a fuel injection amount of the engine 1 based on the operational state output from the operational state calculating means 26.

The injector driving means 28 drives the injector 16 for injecting fuel into an arbitrary one of the cylinders 2 in accordance with the fuel injection amount output from the fuel injection amount calculating means 27.

The actual misfire ratio calculating means 29 makes a determination on the presence/absence of a misfire based on a crank signal output from the crank angle sensor 6, and calculates an actual misfire ratio Rt.

The catalyst damage determining misfire ratio calculating means 30 calculates a misfire determining ratio JRn (n=1, 2, ..., n) for making a determination on a damage-causing misfire state in which the three-way catalyst 22 is assumed to be damaged, based on the operational state output from the operational state calculating means 26.

The catalyst damaging misfire determining means 31 compares the actual misfire ratio Rt with the misfire determining ratio JRn, and outputs a drive prohibiting signal to the injector driving means 28 and cuts off the supply of fuel to a misfired one of the cylinders 2, when it is determined that a misfire state causing damage to the three-way catalyst 22 has arisen.

The misfire ratio storing means 32 stores the actual misfire ratio Rt at the time of a determination that the misfire state causing damage to the three-way catalyst 22 has arisen, as a misfire ratio Rm at the time of a determination that a damage-causing misfire state has arisen.

The fuel supply cutoff recovery means 33 outputs a drive permitting signal to the injector driving means 28 to make a recovery from the cutoff of the fuel supply on the ground that a predetermined condition is satisfied, when the misfire determining ratio JRn has become larger than the misfire ratio Rm at the time of the determination that the damage-causing misfire state has arisen.

The actual misfire ratio Rt is calculated as a ratio of the number of misfires to a predetermined number of times of operations of the spark plug 14. When the actual misfire ratio Rt has become larger than the misfire determining ratio JRn, it is determined that the misfire state causing damage to the three-way catalyst 22 has arisen.

The misfire determining ratio JRn is a value that has been set for each of a plurality of operational states, which is determined by an engine rotational speed and a filling efficiency, by checking, through an experiment or the like, a misfire ratio that rises until a critical temperature causing no damage to the three-way catalyst 22 is reached while allowing a misfire to last. The misfire determining ratio JRn is stored in, for example, the ROM as a map.

Figure 3:
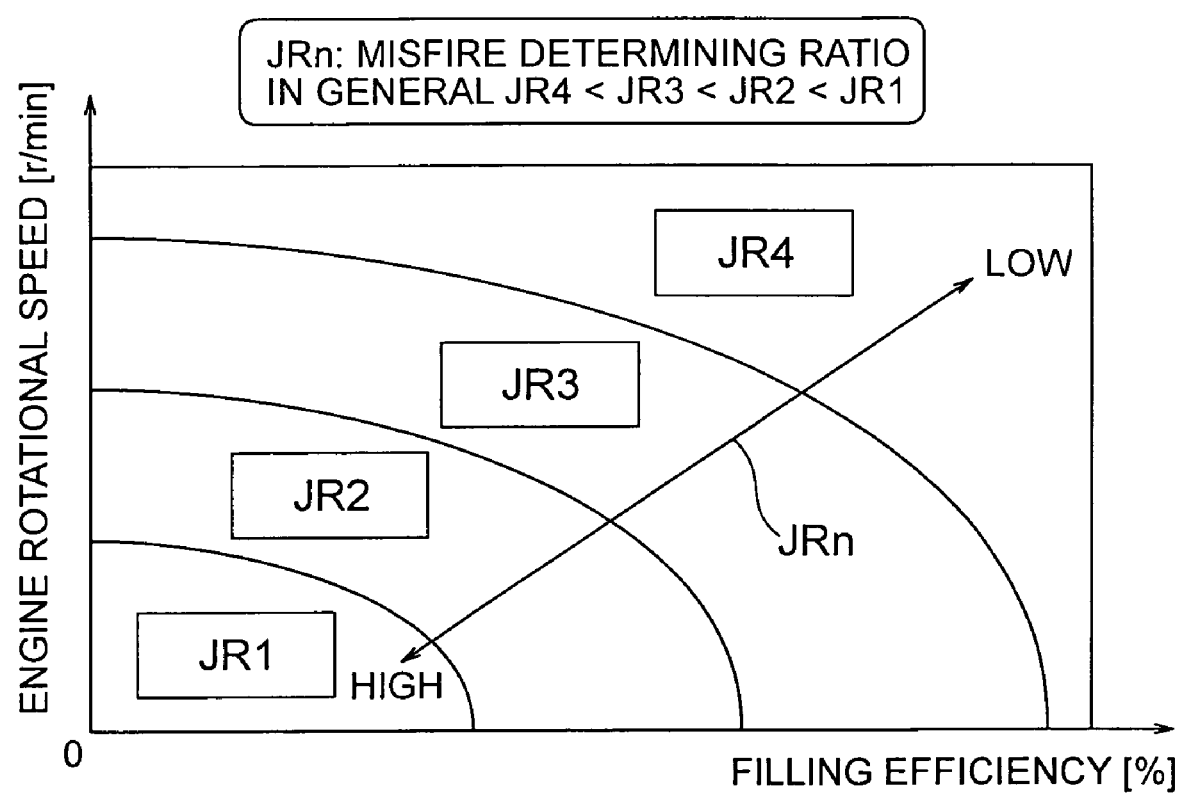
FIG. 3 is an explanatory diagram showing a relationship between an operational state of an engine and a misfire determining ratio according to the first embodiment of the present invention.

FIG. 3 is an explanatory diagram showing a relationship between the operational state and the misfire determining ratio JRn according to the first embodiment of the present invention.

Referring to FIG. 3, the operational state of the engine 1 is classified into four regions in accordance with the engine rotational speed and the filling efficiency. Four different misfire ratios JR1 to JR4 for making a determination, which correspond to those regions respectively, are set as the misfire determining ratio JRn.

Given herein that the actual misfire ratio Rt remains unchanged, the amount of unburnt fuel flowing into the three-way catalyst 22 per unit time increases and the increase in the amount of heat generated through combustion in the three-way catalyst 22 becomes larger as the operational state of the engine 1 approaches a high rotational speed/high load state (i.e., a state in which both the engine rotational speed and the filling efficiency are high). Thus, the three-way catalyst 22 is damaged early.

Therefore, as shown in FIG. 3, the misfire determining ratio JRn is set lower as the operational state of the engine 1 approaches a high rotational speed/high load region (i.e., a region in which both the engine rotational speed and the filling efficiency are high), so the supply of fuel is cut off before the temperature of the three-way catalyst 22 reaches a critical temperature TL.

The operation of the engine control apparatus according to the first embodiment of the present invention will be described hereinafter with reference to a flowchart of FIG. 4 as well as FIGS. 1 to 3. The operation shown in this flowchart is performed on a predetermined cycle.

First of all, the catalyst damaging misfire determining means 31 determines whether or not the actual misfire ratio Rt is equal to or larger than the misfire determoning ratio JRn for making a determination on a misfire state causing damage to the three-way catalyst 22 (Step S41).

When it is determined in Step S41 that the actual misfire ratio Rt is equal to or larger than the misfire determining ratio JRn (i.e., Yes), the misfire ratio storing means 32 stores the actual misfire ratio Rt at the time of the determination that the damage-causing misfire state has arisen, as the misfire ratio Rm at the time of the determination that the damage-causing misfire state has arisen (Step S42).

Then, the catalyst damaging misfire determining means 31 outputs a drive prohibiting signal to the injector driving means 28, thereby cutting off the supply of fuel to a misfired one of the cylinders 2 (Step S43).

Thus, unburnt fuel can be prevented from flowing into the three-way catalyst 22, so the temperature of the three-way catalyst 22 is lowered. As a result, the three-way catalyst 22 can be protected from being damaged.

Subsequently, after the cutoff of the fuel supply has been started, the fuel supply cutoff recovery means 33 determines whether or not the misfire determining ratio JRn is larger than the misfire ratio Rm at the time of the determination that the damage-causing misfire state has arisen (Step S44).

When it is determined in Step S44 that the misfire ratio Rm at the time of the determination that the damage-causing misfire state has arisen is equal to or larger than the misfire determining ratio JRn (i.e., No), the engine control apparatus makes a transition to Step S43 to continue the cutoff of the fuel supply.

That is, in the case where the operational state of the engine 1 is identical to the operational state at the time of the determination that the damage-causing misfire state has arisen or at a higher rotational speed/higher load state, the temperature of the three-way catalyst 22 may rise suddenly when unburnt fuel flows thereinto, so the engine control apparatus continues the cutoff of the fuel supply.

Figure 4:
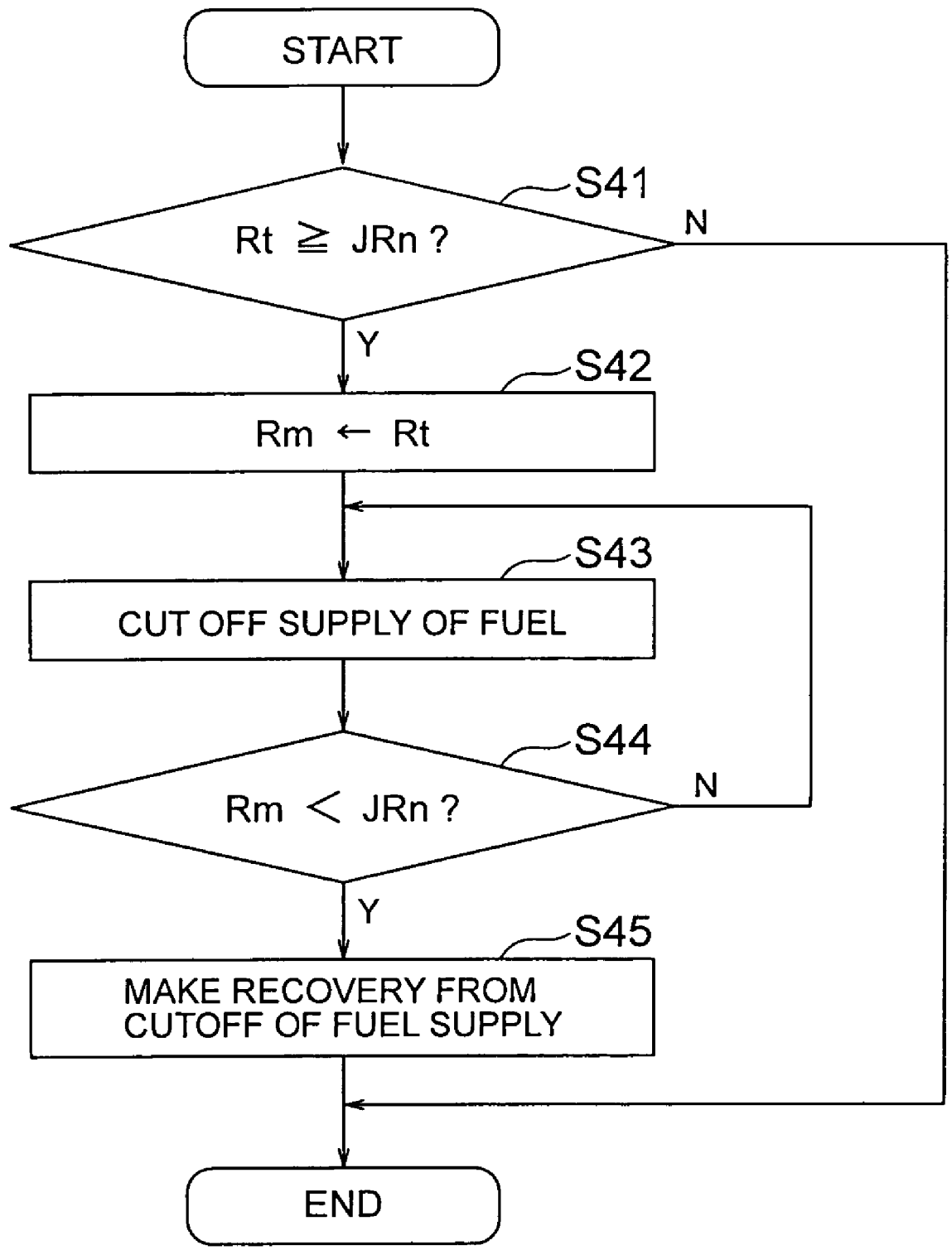
FIG. 4 is a flowchart showing the operation of the engine control apparatus according to the first embodiment of the present invention.

On the other hand, when it is determined in Step S44 that the misfire determining ratio JRn is larger than the misfire ratio Rm at the time of the determination that the damage-causing misfire state has arisen (i.e., Yes) due to a change in the operational state of the engine 1, the fuel supply cutoff recovery means 33 outputs a drive permitting signal to the injector driving means 28 to make a recovery from the cutoff of the fuel supply (Step S45), thereby terminating the processing of FIG. 4.

When it is determined in Step S41 that the actual misfire ratio Rt is smaller than the misfire determining ratio JRn (i.e., No), it is not determined that the damage-causing misfire state has arisen. Thus, the engine control apparatus terminates the processing of FIG. 4 while continuing normal operation.

Figure 5:
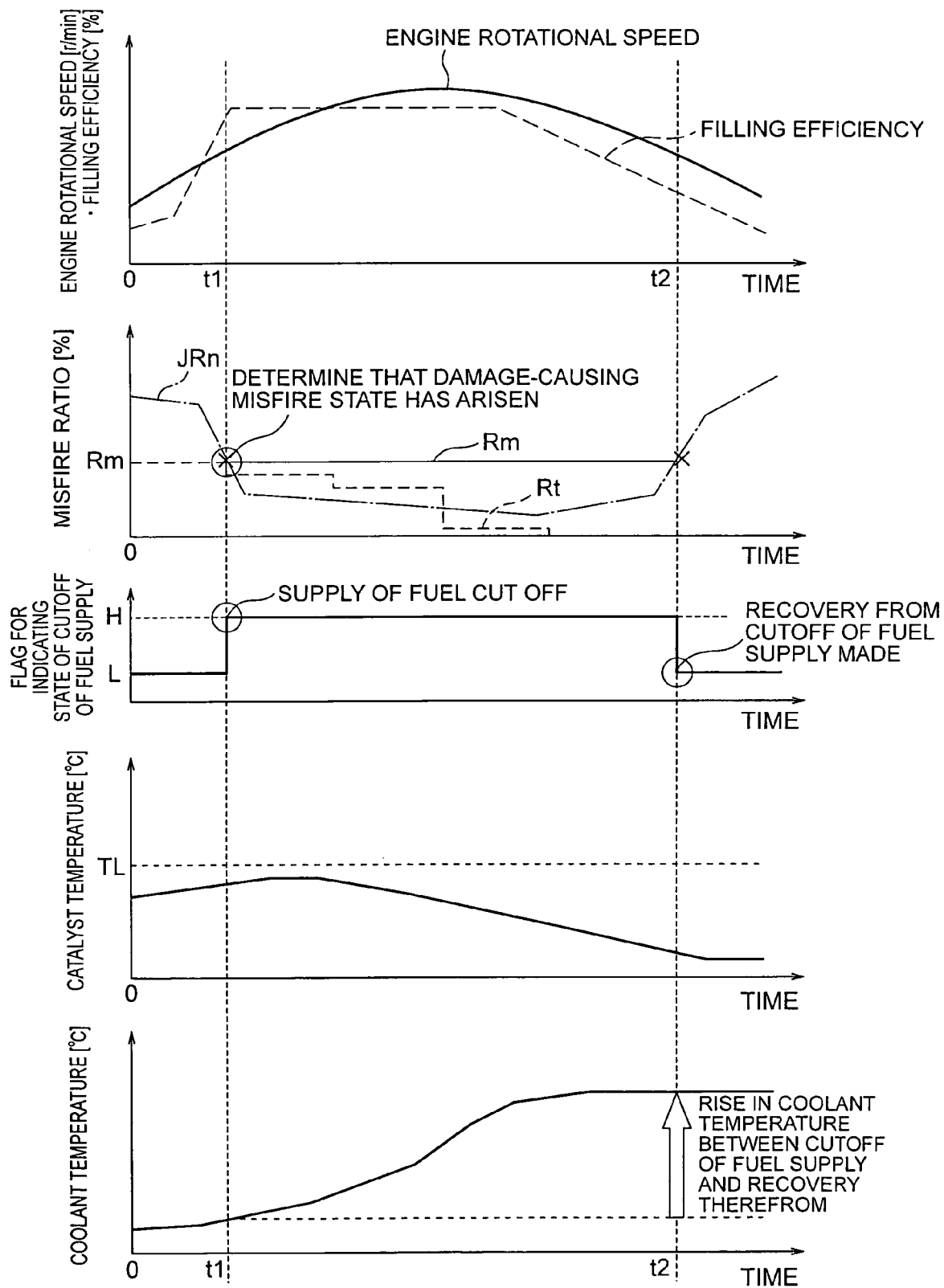
FIG. 5 is a timing chart for giving a supplementary explanation of the operation of the engine control apparatus according to the first embodiment of the present invention.

A supplementary explanation of the operation of the engine control apparatus shown in the flowchart of FIG. 4 will be given hereinafter with reference to a timing chart of FIG. 5 as well as FIGS. 1 to 4:

FIG. 5 is the timing chart for giving supplementary explanation of the operation of the engine control apparatus according to the first embodiment of the present invention.

Referring to FIG. 5, first of all, when the engine rotational speed and the filling efficiency increase as a result of a change in the operational state of the engine 1, the misfire determining ratio JRn decreases as shown in FIG. 3. The actual misfire ratio Rt becomes equal to or larger than the misfire determining ratio JRn at a time t1.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

Thus, unburnt fuel can be prevented from flowing into the three-way catalyst 22. Therefore, after the cutoff of the fuel supply has been started, the actual misfire ratio Rt decreases, and the temperature of the three-way catalyst 22 lowers without reaching the critical temperature TL.

The engine 1 is warmed up with the lapse of time due to those of the cylinders 2 in which the cutoff of the fuel supply is not carried out, so the coolant temperature indicating the temperature of the engine 1 rises gradually.

Then, when the engine rotational speed and the filling efficiency decrease as a result of a change in the operational state of the engine 1, the misfire determining ratio JRn increases. At a time t2, the misfire determining ratio JRn becomes larger than the misfire ratio Rm at the time of the determination that the damage-causing misfire state has arisen.

Subsequently, the flag for indicating the state of the cutoff of the fuel supply is set to "L" to make a recovery from the cutoff of the fuel supply.

The engine 1 has further been warmed up at this moment, so the temperature of coolant further rises.

Therefore, fuel is in a combustible state due to an increase in volatility resulting from a rise in coolant temperature when the misfire has occurred as a result of a temporary cause such as insufficient combustion at low temperatures or the like.

In other words, the misfire continues if it has occurred as a result of a permanent cause such as a malfunction in an ignition system or the like. Therefore, it is determined again in Step S41 of FIG. 4 that the damage-causing misfire state has arisen, so the supply of fuel is cut off to protect the three-way catalyst 22.

The misfire is remedied due to an increase in volatility of fuel resulting from a rise in coolant temperature when it has occurred as a result of a transient cause such as insufficient combustion at low temperatures or the like. Therefore, it is not determined in Step S41 of FIG. 4 that the damage-causing misfire state has arisen, so normal operation of the engine 1 is continued.

In the engine control apparatus according to the first embodiment of the present invention, the catalyst damaging misfire determining means 31 compares the actual misfire ratio Rt with the misfire determining ratio JRn, and cuts off the supply of fuel to a misfired one of the cylinders 2 when it is determined that the misfire state causing damage to the three-way catalyst 22 has arisen.

Then, the fuel supply cutoff recovery means 33 outputs a drive permitting signal to the injector driving means 28 to make a recovery from the cutoff of the fuel supply, when the misfire determining ratio JRn has become larger than the misfire ratio Rm at the time of the determination that the damage-causing misfire state has arisen.

Thus, on the basis of the operational state of the engine 1, a recovery from the cutoff of the fuel supply can be made in a region causing no damage to the three-way catalyst 22. Therefore, the three-way catalyst 22 can be reliably protected from being damaged without entailing any rise in cost.

The engine 1 is further warmed up due to those of the cylinders 2 in which the cutoff of the fuel supply is not carried out, and the volatility of fuel increases due to a rise in coolant temperature, when the misfire has occurred as a result of a transient cause such as insufficient combustion based on the use of low volatile fuel in a cold state.

Thus, normal operation of the engine 1 can be resumed when a recovery from the cutoff of the fuel supply is made. As a result, it is possible to ensure the engine 1 of its original output performance again and restore the power performance thereof.

Second Embodiment

In the foregoing first embodiment of the present invention, when the operational state of the engine 1 (the engine rotational speed and the filling efficiency) changes near a switchover in the misfire determining ratio JRn, the misfire determining ratio JRn frequently changes past the actual misfire ratio Rt or the misfire ratio Rm at the time of the determination that the damage-causing misfire state has arisen. Therefore, the cutoff of the fuel supply and the recovery therefrom are carried out repeatedly.

The operation of the engine control apparatus in the case where the operational state of the engine 1 has changed in near the switchover in the misfire determining ratio JRn will be described hereinafter with reference to a timing chart of FIG. 6.

Figure 6:
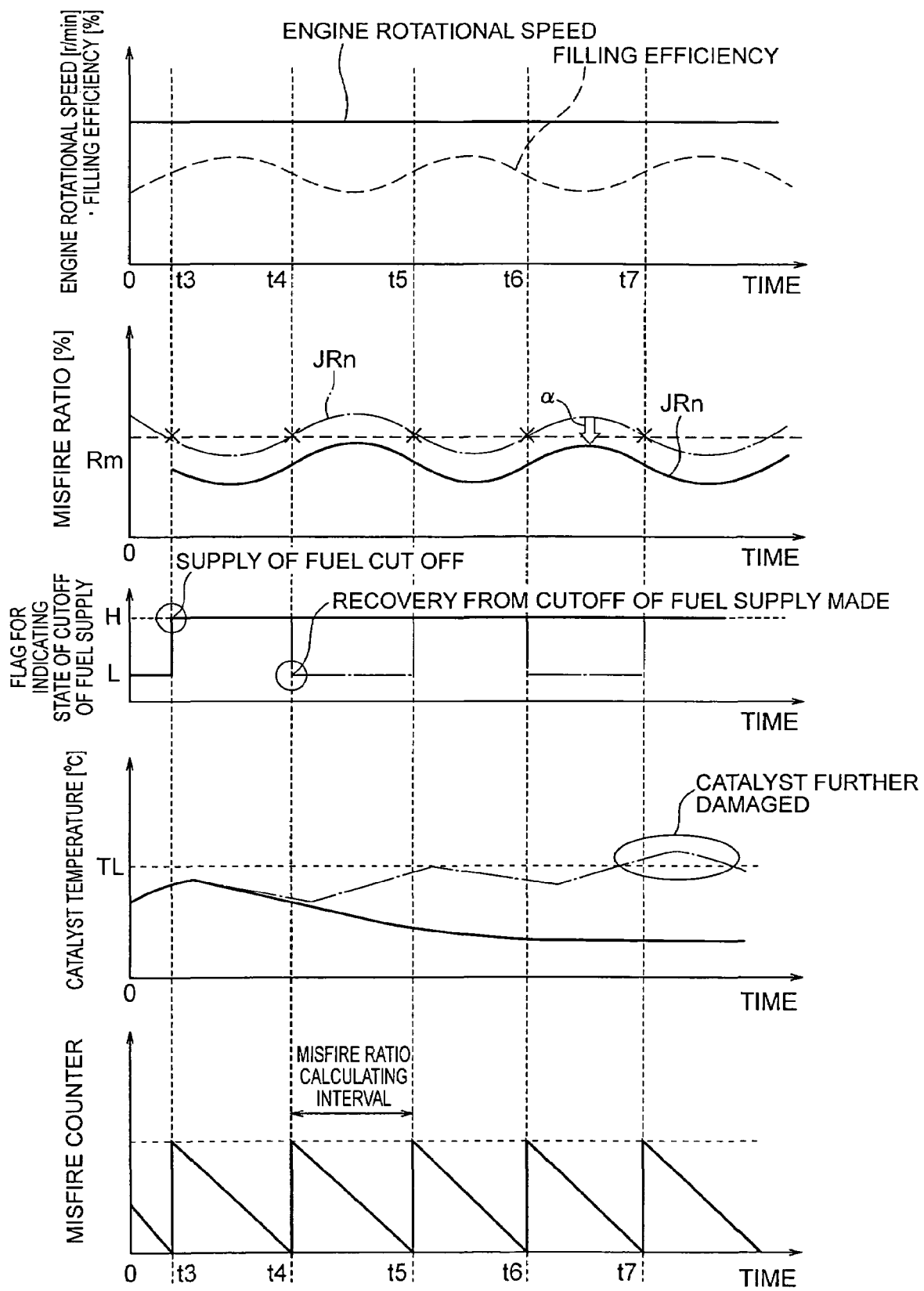
FIG. 6 is a timing chart showing the operation of an engine control apparatus according to a second embodiment of the present invention at a time when a change in operational state of an engine has occurred in the neighborhood of a border corresponding to a switchover in misfire determining ratio.

Referring to FIG. 6, first of all, when the operational state of the engine 1 changes, the misfire determining ratio JRn changes as indicated by alternate long and short dashed lines, and the actual misfire ratio Rt becomes equal to or larger than the misfire determining ratio JRn at a time t3.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

Then, the misfire determining ratio JRn becomes larger than the misfire ratio Rm at the time of the determination that the damage-causing misfire state has arisen at a time t4 due to a change in the operational state of the engine 1, and the flag for indicating the state of cutoff of the fuel supply is set to "L" as indicated by alternate long and short dashed lines so as to make a recovery from the cutoff of the fuel supply.

After that, at times t5, t6, and t7, the misfire determining ratio JRn changes past the actual misfire ratio Rt or the misfire ratio Rm at the time of the determination that the damage-causing misfire state has arisen, so the cutoff of the fuel supply and the recovery therefrom are carried out repeatedly.

A misfire counter counts the number of times of ignition of the spark plug 14 to measure a remaining time (a misfire ratio calculating interval) until a misfire ratio is calculated subsequently. The actual misfire ratio calculating means 29 calculates the actual misfire ratio Rt with this misfire ratio calculating interval, and the catalyst damaging misfire determining means 31 also makes a determination on a misfire state causing damage to the three-way catalyst 22 with this interval.

Thus, until it is determined subsequently that a damage-causing misfire state has arisen after a recovery from the cutoff of the fuel supply, unburnt fuel flows into the three-way catalyst 22 with its temperature having reached the critical temperature TL as indicated by alternate long and short dashed lines in FIG. 6. Therefore, the three-way catalyst 22 may further be damaged.

Therefore, it is desirable to subtract a predetermined misfire ratio α from the misfire determining ratio JRn in advance and thereby change a condition for making a recovery from the cutoff of the fuel supply.

Thus, the recovery from the cutoff of the fuel supply is made in a region in which the misfire determining ratio JRn is sufficiently larger than a value at the start of the cutoff of the fuel supply, namely, a region in which the temperature of the three-way catalyst 22 is unlikely to rise, so the cutoff of the fuel supply and the recovery therefrom are not carried out repeatedly. As a result, the three-way catalyst 22 can be prevented from being damaged.

A processing of subtracting the predetermined misfire ratio α from the misfire determining ratio JRn to calculate a corrected misfire determining ratio JRr (=JRn-α) for making a determination on recovery will be described.

Elements similar to those of the first embodiment of the present invention are denoted by the same reference symbols with "A" accompanied thereafter and will not be described in detail below.

Figure 7:
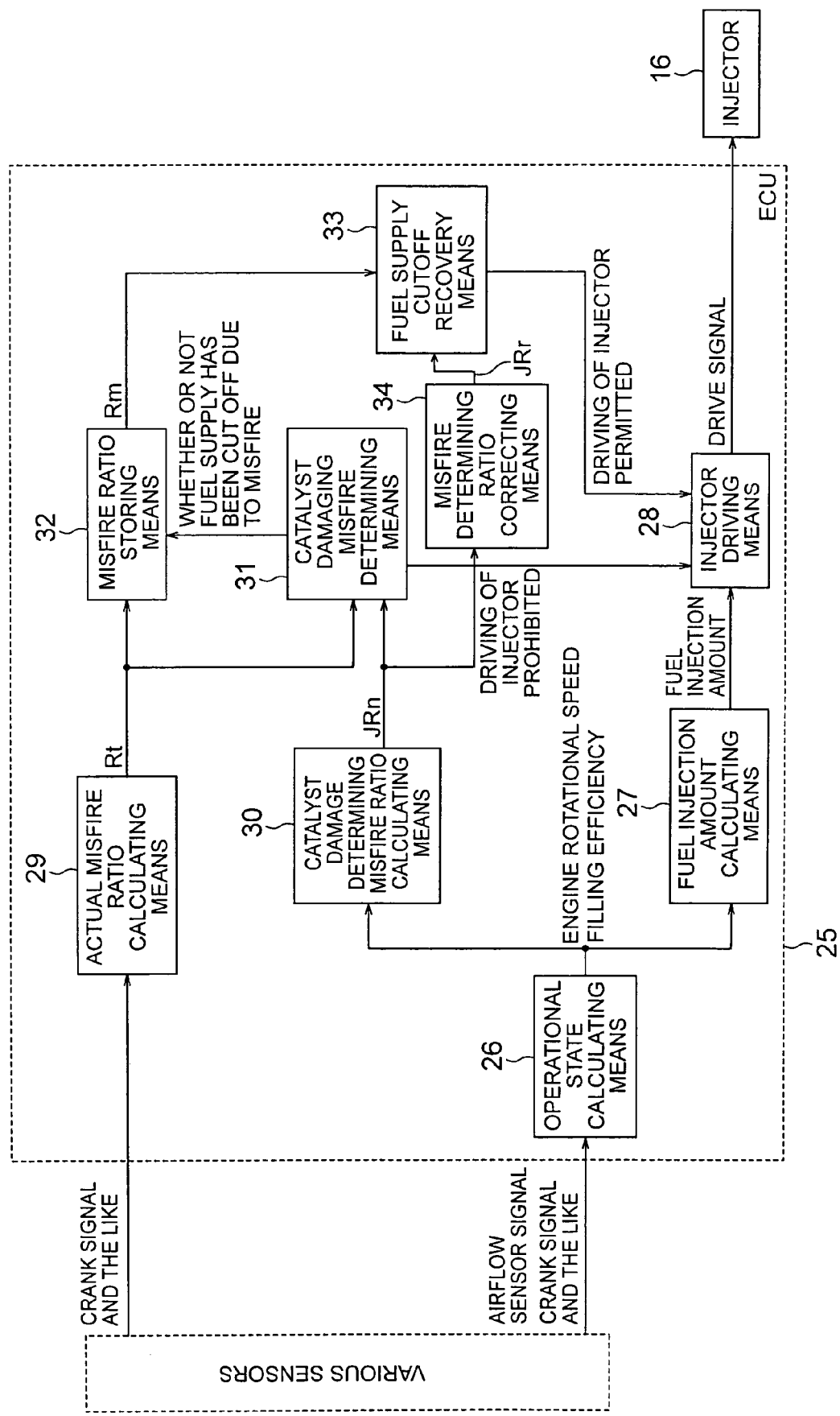
FIG. 7 is a block diagram showing an ECU of the engine control apparatus according to the second embodiment of the present invention.

FIG. 7 is a block diagram showing the ECU 25A of the engine control apparatus according to the second embodiment of the present invention.

Referring to FIG. 7, an ECU 25A is equipped with a misfire determining ratio correcting means 34 for subtracting the predetermined misfire ratio α from the misfire determining ratio JRn to calculate the corrected misfire determining ratio JRr for making a determination on recovery.

Other configurational details of the second embodiment of the present invention are identical to those of the first embodiment of the present invention and will not be described below.

The operation of the engine control apparatus according to the second embodiment of the present invention will be described hereinafter with reference to a flowchart of FIG. 8 as well as FIGS. 6 and 7.

The operation identical to that of the first embodiment of the present invention will not be described below.

Subsequently, after the cutoff of the fuel supply has been started, the fuel supply cutoff recovery means 33 determines whether or not the corrected misfire determining ratio JRr for making a determination on recovery is larger than the misfire ratio Rm at the time of the determination that the damage-causing misfire state has arisen (Step S51).

When it is determined in Step S51 that the misfire ratio Rm at the time of the determination that the damage-causing misfire state has arisen is equal to or larger than the corrected misfire determining ratio JRr for making a determination on recovery (i.e., No), the engine control apparatus makes a transition to Step S43 to continue the cutoff of the fuel supply.

Figure 8:
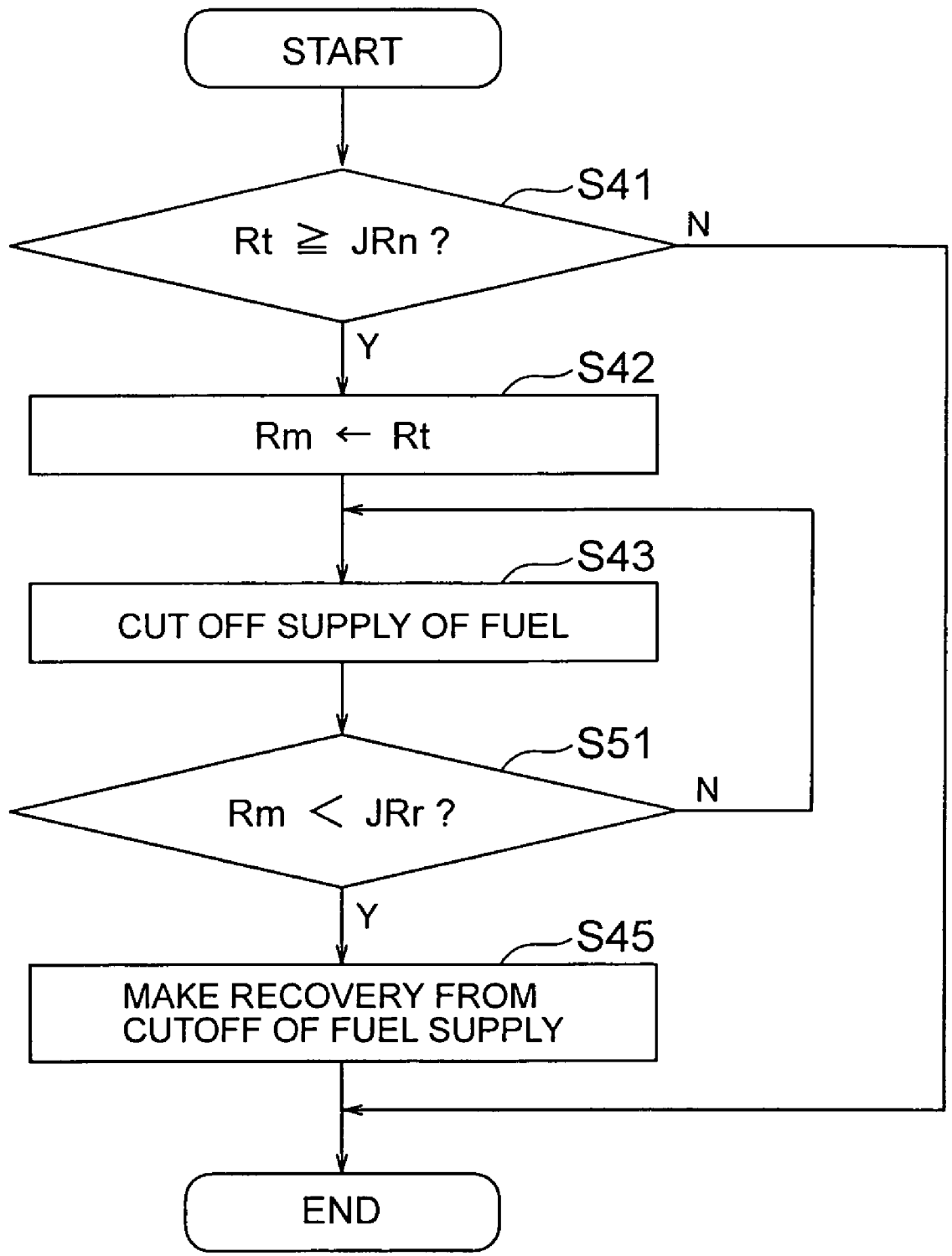
FIG. 8 is a flowchart showing the operation of the engine control apparatus according to the second embodiment of the present invention.

On the other hand, when it is determined in Step S51 that the corrected misfire determining ratio JRr for making a determination on recovery is larger than the misfire ratio Rm at the time of the determination that the damage-causing misfire state has arisen (i.e., Yes) due to a change in the operational state of the engine 1, the fuel supply cutoff recovery means 33 outputs a drive permitting signal to the injector driving means 28 to make a recovery from the cutoff of the fuel supply (Step S45), thereby terminating the processing of FIG. 8.

A supplementary explanation of the operation of the engine control apparatus shown in the flowchart of FIG. 8 will be given hereinafter with reference to a timing chart of FIG. 6 as well as FIGS. 7.

Referring to FIG. 6, first of all, when the operational state of the engine 1 changes, the misfire determining ratio JRn changes as indicated by solid lines, and the actual misfire ratio Rt becomes equal to or larger than the misfire determining ratio JRn at a time t3.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

The misfire determining ratio correcting means 34 calculates the corrected misfire determining ratio JRr for making a determination on recovery. When the corrected misfire determining ratio JRr for making a determination on recovery is larger than the misfire ratio Rm at the time of the determination that a damage-causing misfire state has arisen, the fuel supply cutoff recovery means 33 makes a recovery from the cutoff of the fuel supply. After the time t3, therefore, the recovery from the cutoff of the fuel supply is not made, so the flag for indicating the state of cutoff of the fuel supply is held at "H" as indicated by a solid line.

Thus, unburnt fuel can be prevented from flowing into the three-way catalyst 22.

In the engine control apparatus according to the second embodiment of the present invention, the misfire determining ratio correcting means 34 subtracts the predetermined misfire ratio α from the misfire determining ratio JRn to calculate the corrected misfire determining ratio JRr for making a determination on recovery, and the fuel supply cutoff recovery means 33 outputs a drive permitting signal to the injector driving means 28 to make a recovery from the cutoff of the fuel supply when the corrected misfire determining ratio JRr for making a determination on recovery has become larger than the misfire ratio Rm at the time of the determination that the damage-causing misfire state has arisen.

Thus, the recovery from the cutoff of the fuel supply is not made immediately even when a change in the operational state of the engine 1 has occurred. The recovery from the cutoff of the fuel supply is made in a region having a sufficient margin with respect to the critical temperature TL. Therefore, unburnt fuel does not flow into the three-way catalyst 22 with its temperature having reached the critical temperature TL, so the three-way catalyst 22 can be protected more reliably from being damaged.

Third Embodiment

In general, when the operational state of the engine 1 is a high rotational speed/high load state (i.e., a state in which both the engine rotational speed and the filling efficiency are high), the temperature of the three-way catalyst 22 becomes high even if unburnt fuel does not flow thereinto. A determination on a damage-causing misfire state is made based on a misfire ratio corresponding to the limit of a permissible temperature for a misfire in a steady operational state.

In the foregoing first embodiment of the present invention, therefore, if a recovery from the cutoff of the fuel supply is made with the three-way catalyst 22 at a high temperature immediately after the high rotational speed/high load operation has been performed, unburnt fuel flows into the three-way catalyst 22 when a misfire occurs again. Thus, the temperature of the three-way catalyst 22 exceeds the critical temperature TL, and the three-way catalyst 22 may be damaged.

The operation of the engine control apparatus in making a recovery from the cutoff of the fuel supply in a high rotational speed/high load state will be described hereinafter with reference to a timing chart of FIG. 9.

Figure 9:
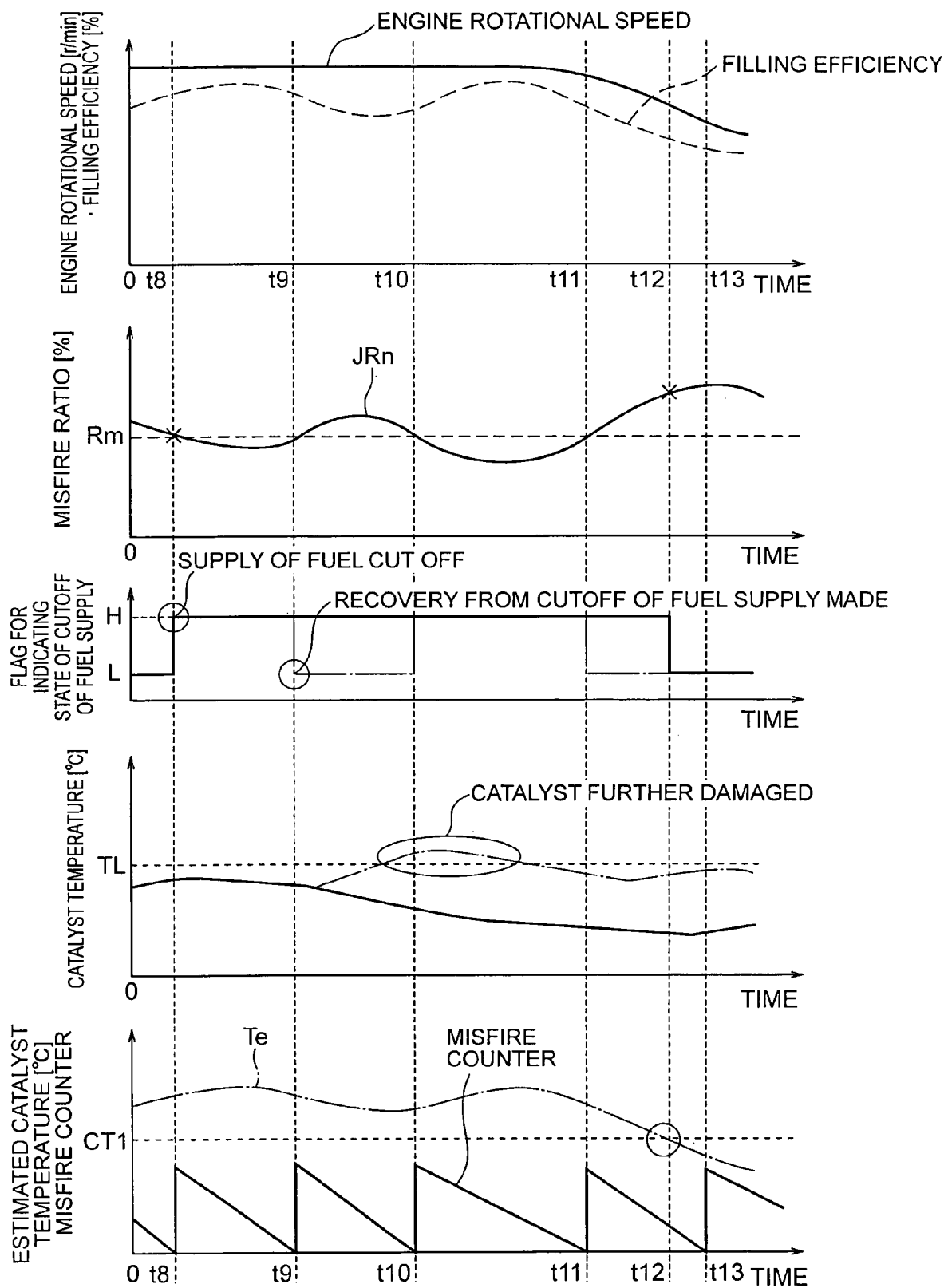
FIG. 9 is a timing chart showing the operation of an engine control apparatus according to a third embodiment of the present invention at a time when a recovery from the cutoff of the fuel supply is made in a high rotational speed/high load state.

Referring to FIG. 9, first of all, when the operational state of the engine 1 changes, the misfire determining ratio JRn changes, and the actual misfire ratio Rt becomes equal to or larger than the misfire determining ratio JRn at a time t8.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

Then, the misfire determining ratio JRn becomes larger than the misfire ratio Rm at the time of the determination that the damage-causing misfire state has arisen at a time t9 due to a change in the operational state of the engine 1, and the flag for indicating the state of cutoff of the fuel supply is set to "L" as indicated by alternate long and short dashed lines so as to make a recovery from the cutoff of the fuel supply.

When a misfire occurs at this moment, unburnt fuel flows into the three-way catalyst 22. The temperature of the three-way catalyst 22 then exceeds the critical temperature TL as indicated by alternate long and short dashed lines in FIG. 9, so the three-way catalyst 22 may further be damaged.

Thus, it is desirable to estimate the temperature of the three-way catalyst 22 as an estimated catalyst temperature Te, and make a recovery from the cutoff of the fuel supply in consideration of the estimated catalyst temperature Te.

A processing of calculating the estimated catalyst temperature Te and making a recovery from the cutoff of the fuel supply in consideration of the estimated catalyst temperature Te will be described hereinafter.

Elements similar to those of the first embodiment of the present invention are denoted by the same reference symbols with "B" accompanied thereafter and will not be described in detail below.

Figure 10:
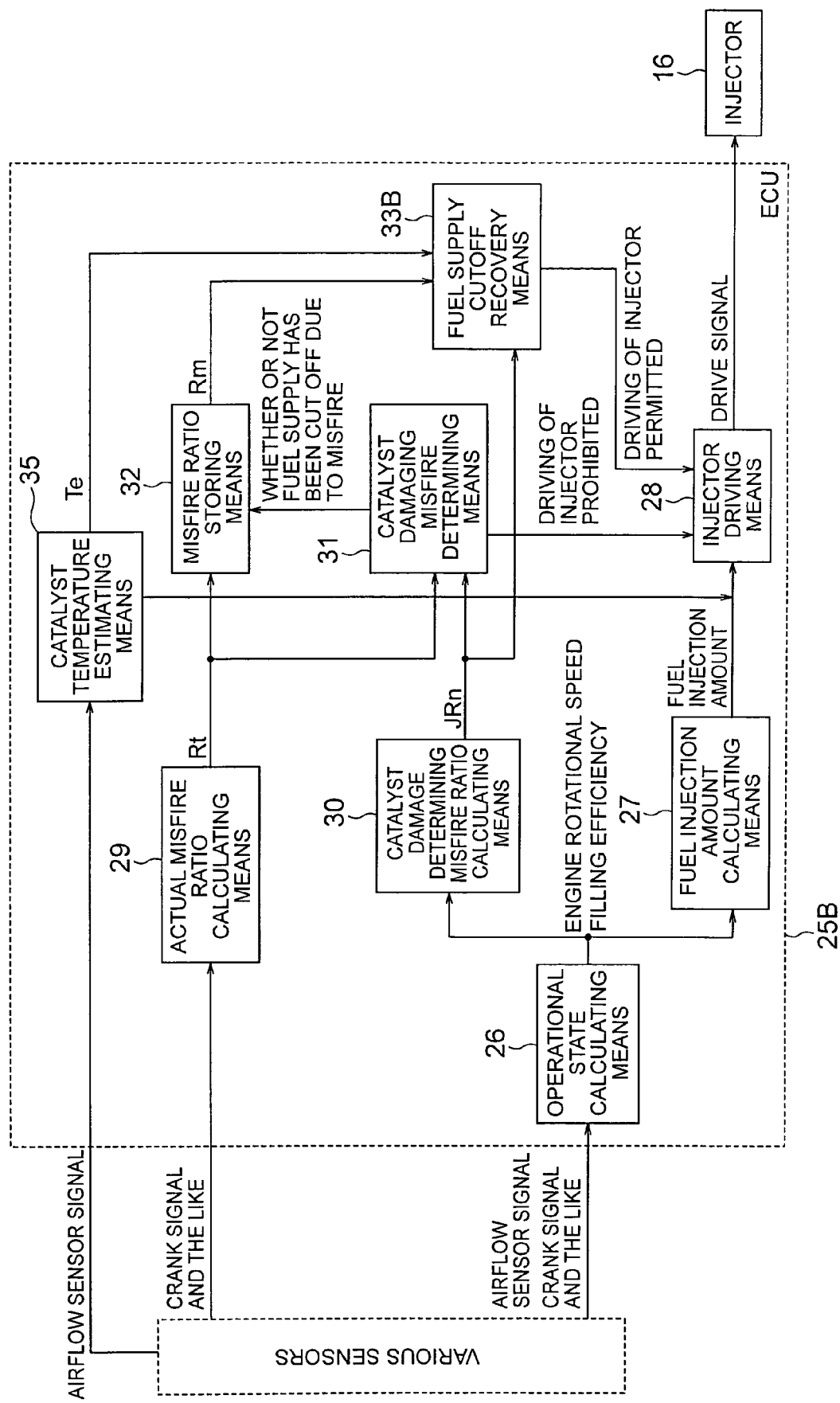
FIG. 10 is a block diagram showing an ECU of the engine control apparatus according to the third embodiment of the present invention.

FIG. 10 is a block diagram showing the ECU 25B of the engine control apparatus according to the third embodiment of the present invention.

Referring to FIG. 10, an ECU 25B is equipped with a catalyst temperature estimating means 35 for estimating a temperature of the three-way catalyst 22 during normal combustion free from a misfire as the estimated catalyst temperature Te based on an airflow sensor signal output from the airflow sensor 21 and a fuel injection amount calculated by the fuel injection amount calculating means 27.

In general, when the amount of intake air is large, the amount of heat generated in the engine 1 increases. Therefore, the amount of heat given to the three-way catalyst 22 also increases, so the temperature of the three-way catalyst 22 rises. On the other hand, when the supply of fuel is cut off, the supply of heat from the engine 1 is stopped. Therefore, the temperature of the three-way catalyst 22 lowers.

Thus, the catalyst temperature estimating means 35 estimates the estimated catalyst temperature Te based on this principle.

A fuel supply cutoff recovery means 33B outputs a drive permitting signal to the injector driving means 28 to make a recovery from the cutoff of the fuel supply when the misfire determining ratio JRn has become larger than the misfire ratio Rm at the time of the determination that the damage-causing misfire state has arisen and the estimated catalyst temperature Te is lower than a predetermined catalyst temperature CT1 that is arbitrarily set in advance.

Other configurational details of the third embodiment of the present invention are identical to those of the first embodiment of the present invention and will not be described below.

Figure 11:
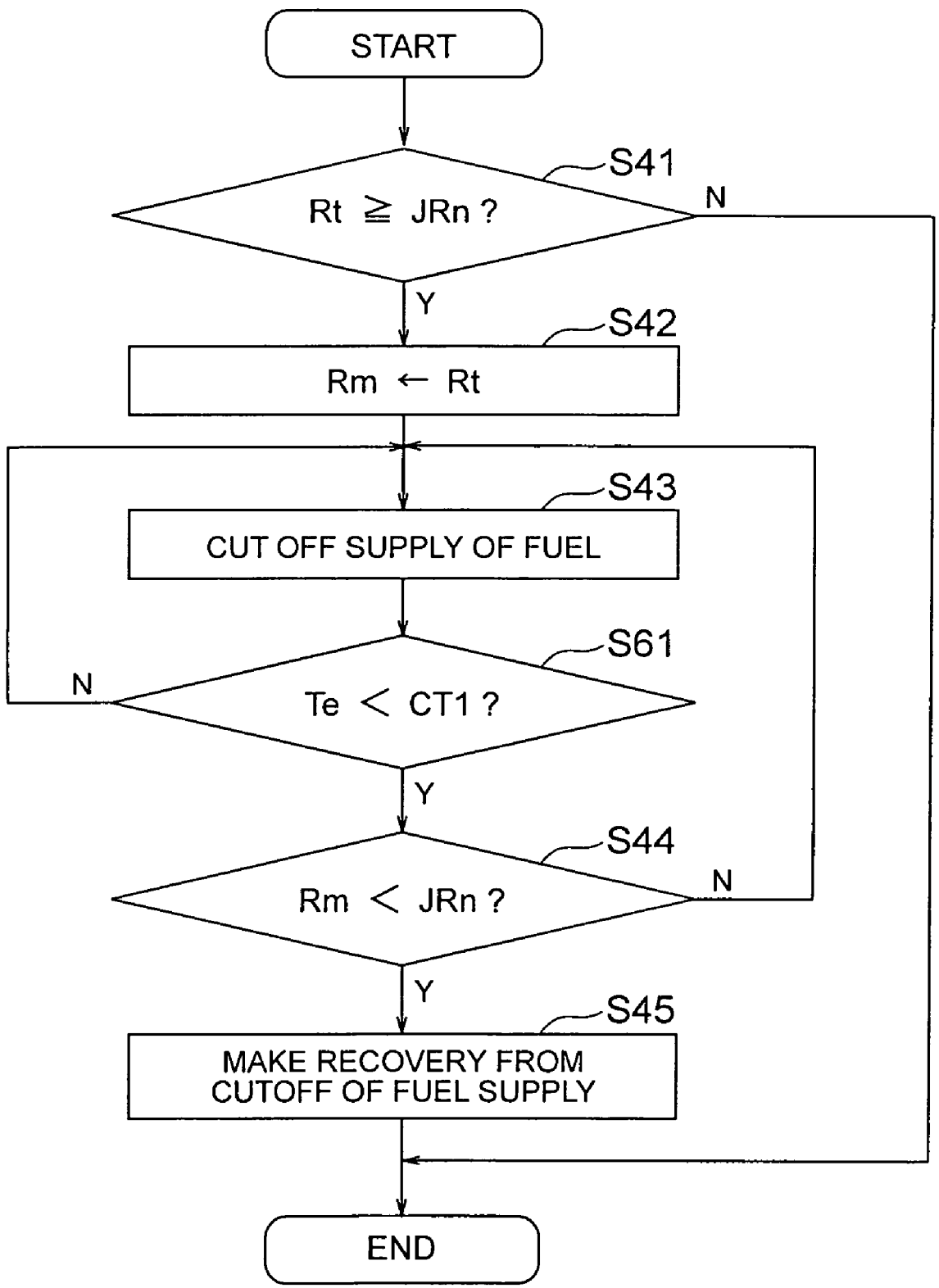
FIG. 11 is a flowchart showing the operation of the engine control apparatus according to the third embodiment of the present invention.

The operation of the engine control apparatus according to the third embodiment of the present invention will be described hereinafter with reference to a flowchart of FIG. 11 as well as FIGS. 9 and 10.

The operation identical to that of the first embodiment of the present invention will not be described.

After the cutoff of the fuel supply has been started, the fuel supply cutoff recovery means 33B determines whether or not the estimated catalyst temperature Te is lower than the predetermined catalyst temperature CT1 (Step S61).

When it is determined in Step S61 that the estimated catalyst temperature Te is lower than the predetermined catalyst temperature CT1 (i.e., Yes), the fuel supply cutoff recovery means 33B determines whether or not the misfire determining ratio JRn is larger than the misfire ratio Rm at the time of the determination that the damage-causing misfire state has arisen (Step S44).

On the other hand, when it is determined in Step S61 that the estimated catalyst temperature Te is equal to or higher than the predetermined catalyst temperature CT1 (i.e., No), the engine control apparatus makes a transition to Step S43 to continue the cutoff of the fuel supply.

A supplementary explanation of the operation of the engine control apparatus,shown in the flowchart of FIG. 11 will be given with reference to the timing chart of FIG. 9 as well as FIG. 10.

Referring to FIG. 9, first of all, when the operational state of the engine 1 changes, the misfire determining ratio JRn changes, and the actual misfire ratio Rt becomes equal to or larger than the misfire determining ratio JRn at a time t8.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

When the misfire determining ratio JRn has become larger than the misfire ratio Rm at the time of the determination that the damage-causing misfire state has arisen and the estimated catalyst temperature Te is lower than the predetermined catalyst temperature CT1 that is arbitrarily set in advance, the fuel supply cutoff recovery means 33B makes a recovery from the cutoff of the fuel supply.

Thus, after the cutoff of the fuel supply has been started at a time t8, the recovery from the cutoff of the fuel supply is not made until the estimated catalyst temperature Te becomes lower than the predetermined catalyst temperature CT1 at a time t12. The flag for indicating the state of the cutoff of the fuel supply is held at "H" as shown by a solid line.

In the engine control apparatus according to the third embodiment of the present invention, the catalyst temperature estimating means 35 estimates the estimated catalyst temperature Te, and the fuel supply cutoff recovery means 33B outputs a drive permitting signal to the injector driving means 28 to make a recovery from the cutoff of the fuel supply when the misfire determining ratio JRn has become larger than the misfire ratio Rm at the time of the determination that the damage-causing misfire state has arisen and the estimated catalyst temperature Te is lower than the predetermined catalyst temperature CT1 that is arbitrarily set in advance.

Thus, the recovery from the cutoff of the fuel supply is made when the temperature of the three-way catalyst 22 has sufficiently lowered. Therefore, the three-way catalyst 22 can be more reliably protected from being damaged regardless of the operational state of the engine 1 immediately before the recovery from the cutoff of the fuel supply.

Fourth Embodiment

In the foregoing first embodiment of the present invention, when a misfire results from insufficient combustion or the like based on, for example, the use of low volatile fuel in a cold state and no improvement in combustibility has been made due to a failure in the process of warming up the engine 1 despite a recovery from the cutoff of the fuel supply, the misfire occurs again and it is determined that a damage-causing misfire state has arisen. Then, the supply of fuel is cut off.

Thus, when a state in which the temperature of the engine 1 is unlikely to rise, namely, a low-temperature environment, low rotational speed/low load operation, or the like continues, the cutoff of the fuel supply and the recovery therefrom are carried out repeatedly without making any improvement in combustibility. In general, when the engine 1 is at a low temperature, a larger amount of fuel is injected than usual in order to promote warm-up of the engine 1.

The operation of the engine control apparatus in the case where the state in which the temperature of the engine 1 is unlikely to rise has continued will be described hereinafter with reference to a timing chart of FIG. 12.

Figure 12:
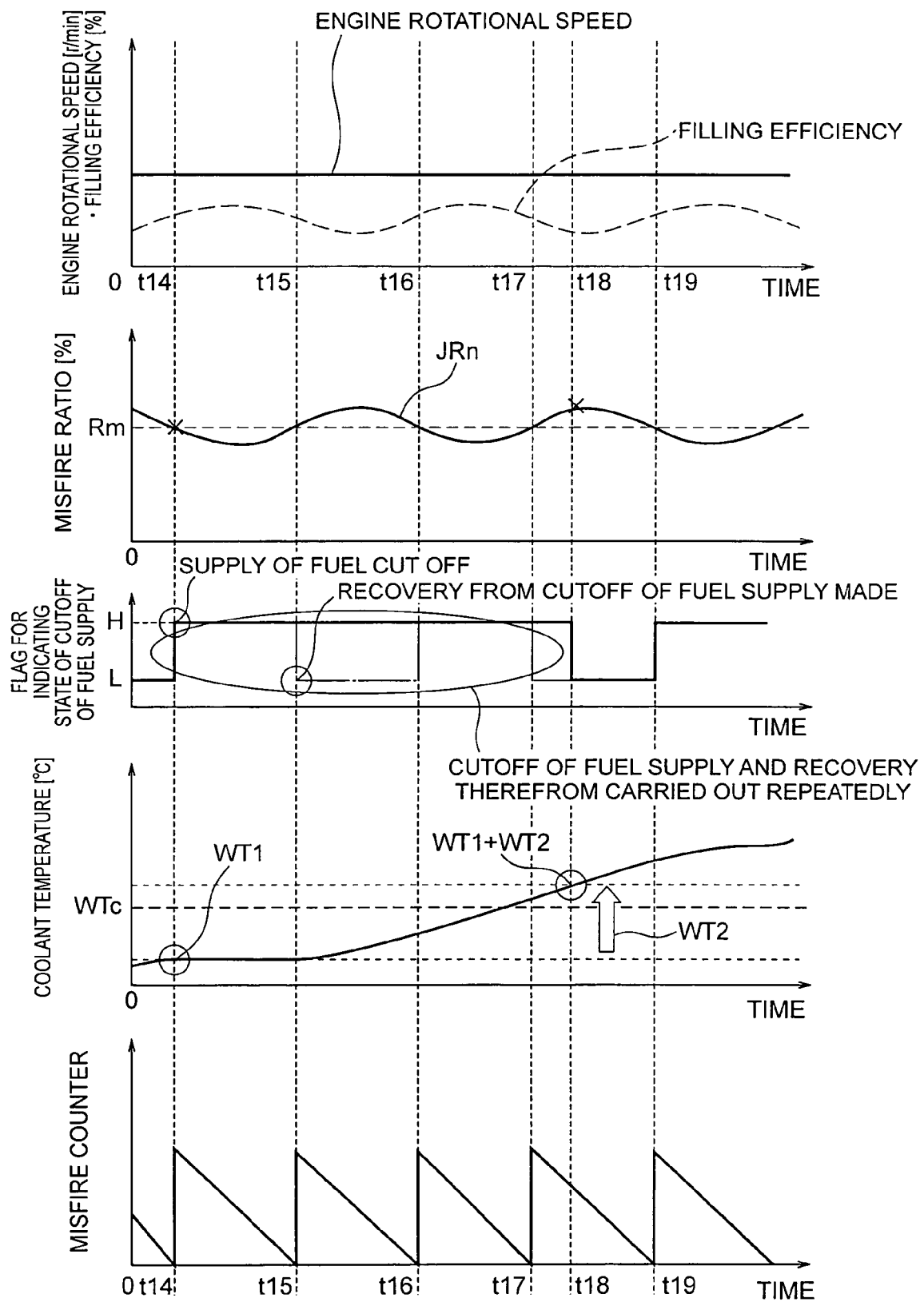
FIG. 12 is a timing chart showing the operation of an engine control apparatus according to a fourth embodiment of the present invention at a time when a rise in temperature of an engine has been unlikely to occur.

Referring to FIG. 12, first of all, when the operational state of the engine 1 changes, the misfire determining ratio JRn changes, and the actual misfire ratio Rt becomes equal to or larger than the misfire determining ratio JRn at a time t14.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

Then, the misfire determining ratio JRn becomes larger than the misfire ratio Rm at the time of the determination that the damage-causing misfire state has arisen at a time t15 due to a change in the operational state of the engine 1, and the flag for indicating the state of cutoff of the fuel supply is set to "L" as indicated by alternate long and short dashed lines so as to make a recovery from the cutoff of the fuel supply.

After that, at times t16, t17, and t19 the misfire determining ratio JRn changes past the actual misfire ratio Rt or the misfire ratio Rm at the time of the determination that the damage-causing misfire state has arisen, so the cutoff of the fuel supply and the recovery therefrom are carried out repeatedly.

Therefore, when unburnt fuel flows into the three-way catalyst 22 with the engine 1 at a low temperature, the temperature of the three-way catalyst 22 is likely to rise abnormally. As a result, the three-way catalyst 22 may be damaged.

Thus, it is desirable to measure a temperature of coolant for cooling the engine 1 and make a recovery from the cutoff of the fuel supply in consideration of the temperature of coolant.

Hereinafter, a processing of measuring a coolant temperature and making a recovery from the cutoff of the fuel supply in consideration of the coolant temperature will be described.

Elements the same as those of the first embodiment of the present invention are denoted by the same reference symbols accompanied with "C" and will not be described in detail below.

Figure 13:
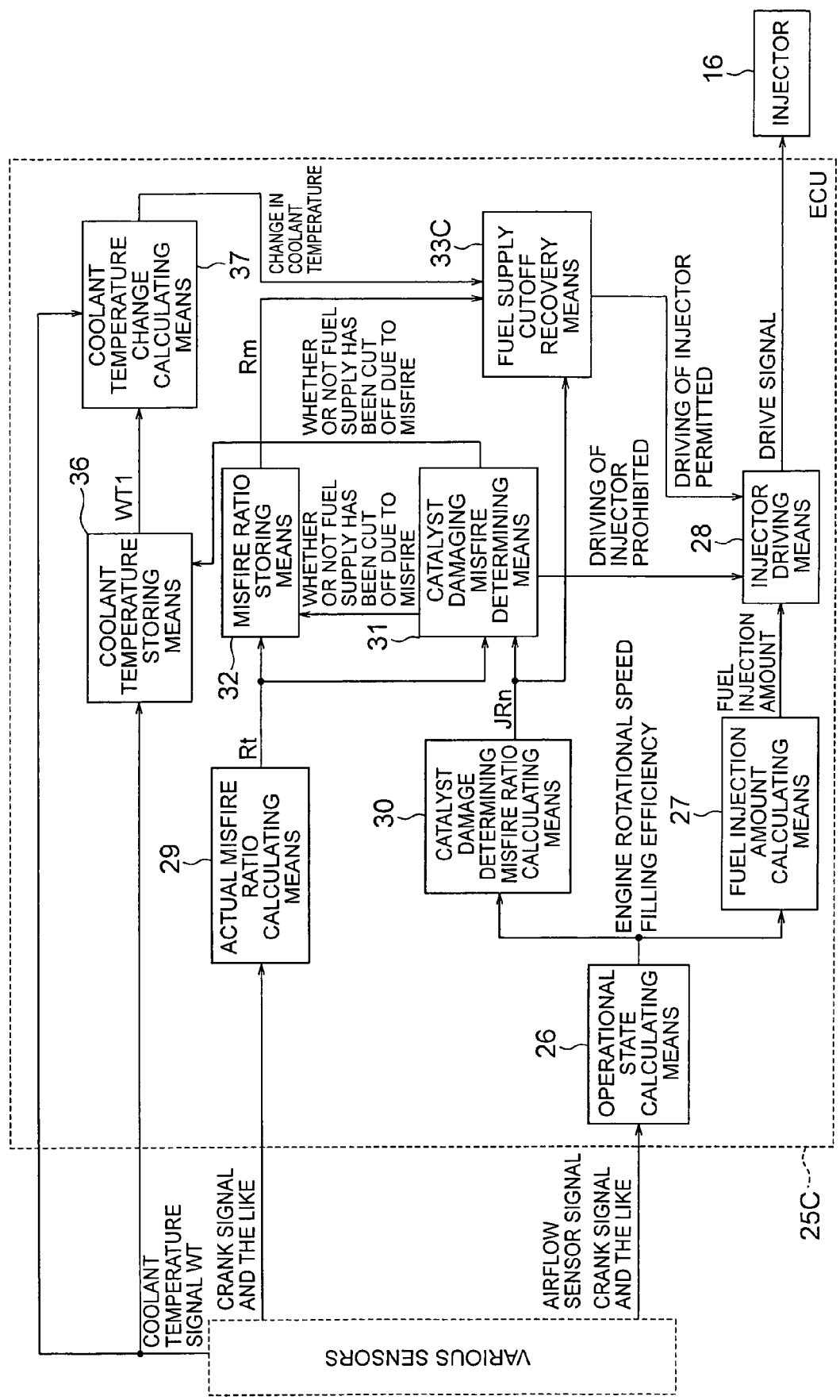
FIG. 13 is a block diagram showing an ECU of the engine control apparatus according to the fourth embodiment of the present invention.

FIG. 13 is a block diagram showing the ECU 25C of the engine control apparatus according to the fourth embodiment of the present invention.

Referring to FIG. 13, an ECU 25C is equipped with a coolant temperature storing means 36 for storing a coolant temperature at the time when it is determined that a misfire state causing damage to the three-way catalyst 22 has arisen as a coolant temperature WT1 at the time of a determination that a damage-causing misfire state has arisen, and a coolant temperature change calculating means 37 for calculating a change in coolant temperature from the coolant temperature WT1 at the time of the determination that the damage-causing misfire state has arisen.

In the case where the coolant temperature WT1 at the time of the determination that the damage-causing misfire state has arisen is lower than a lower-limit coolant temperature WTc that is set as a low coolant temperature state, the fuel supply cutoff recovery means 33C outputs a drive permitting signal to the injector driving means 28 to make a recovery from the cutoff of the fuel supply when a rise in coolant temperature from the coolant temperature WT1 at the time of the determination that the damage-causing misfire state has arisen has become equal to or higher than a predetermined coolant temperature WT2 that is arbitrarily set in advance, and the misfire determining ratio JRn has become larger than the misfire ratio Rm at the time of the determination that the damage-causing misfire state has arisen.

Other configurational details of the fourth embodiment of the present invention are identical to those of the first embodiment of the present invention and will not be described below.

Figure 14:
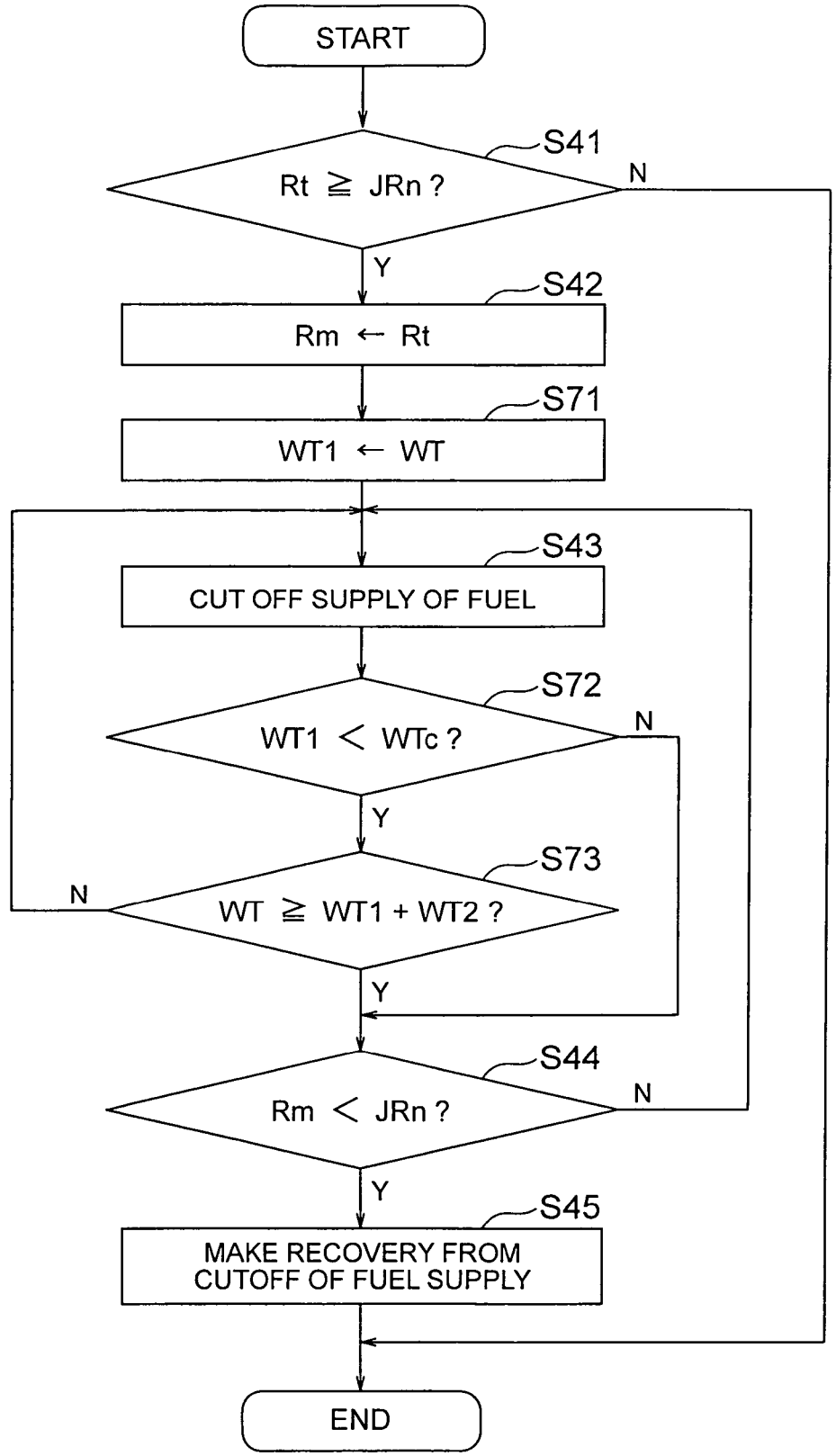
FIG. 14 is a flowchart showing the operation of the engine control apparatus according to the fourth embodiment of the present invention.

The operation of the engine control apparatus according to the fourth embodiment of the present invention will be described hereinafter with reference to a flowchart of FIG. 14 as well as FIGS. 12 and 13.

The operation identical to that of the first embodiment of the present invention will not be described below.

First of all, the coolant temperature storing means 36 stores a coolant temperature at the time when it is determined that a damage-causing misfire state has arisen as the coolant temperature WT1 at the time of the determination that the damage-causing misfire state has arisen (Step S71).

Then, after the cutoff of the fuel supply has been started, the fuel supply cutoff recovery means 33C determines whether or not the coolant temperature WT1 at the time of the determination that the damage-causing misfire state has arisen is lower than the lower-limit coolant temperature WTc (Step S72).

When it is determined in Step S72 that the coolant temperature WT1 at the time of the determination that the damage-causing misfire state has arisen is lower than the lower-limit coolant temperature WTc (i.e., Yes), the fuel supply cutoff recovery means 33C determines whether or not the temperature of coolant has risen from the coolant temperature WT1 at the time of the determination that the damage-causing misfire state has arisen by the predetermined coolant temperature WT2 (Step S73).

When it is determined in Step S73 that the temperature of coolant has risen from the coolant temperature WT1 at the time of the determination that the damage-causing misfire state has arisen by the predetermined coolant temperature WT2 (i.e., Yes) and when it is determined in Step S72 that the coolant temperature WT1 at the time of the determination that the damage-causing misfire state has arisen is equal to or higher than the lower-limit coolant temperature WTc (i.e., No), the fuel supply cutoff recovery means 33C determines whether or not the misfire determining ratio JRn is larger than the misfire ratio Rm at the time of the determination that the damage-causing misfire state has arisen (Step S44).

On the other hand, when it is determined in Step S73 that the temperature of coolant has not risen from the coolant temperature WT1 at the time of the determination that the damage-causing misfire state has arisen by the predetermined coolant temperature WT2 (i.e., No), the engine control apparatus makes a transition to Step S43 to continue the cutoff of the fuel supply.

A supplementary explanation of the operation of the engine control apparatus shown in the flowchart of FIG. 14 will be given with reference to the timing chart of FIG. 12 as well as FIG. 13.

Referring to FIG. 12, first of all, when the operational state of the engine 1 changes, the misfire determining ratio JRn changes and the actual misfire ratio Rt becomes equal to or larger than the misfire determining ratio JRn at a time t14.

Subsequently, the actual misfire ratio Rt at this moment is stored as the misfire ratio Rm at the time of the determination that the damage-causing misfire state has arisen. At the same time, a flag for indicating a state of the cutoff of the fuel supply is set to "H" to cut off the supply of fuel to a misfired one of the cylinders 2.

The fuel supply cutoff recovery means 33C makes a recovery from the cutoff of the fuel supply when the coolant temperature WT1 at the time of the determination that the damage-causing misfire state has arisen, the lower-limit coolant temperature WTc set as the low coolant temperature state, and the predetermined coolant temperature WT2 arbitrarily set in advance satisfy the aforementioned predetermined conditions.

Thus, after the cutoff of the fuel supply has been started at a time t14, the recovery from the cutoff of the fuel supply is not made until the temperature of coolant has risen from the coolant temperature WT1 at the time of the determination that the damage-causing misfire state has arisen by the predetermined coolant temperature WT2 at a time t18. The flag for indicating the state of the cutoff of the fuel supply is held at "H" as indicated by a solid line.

In the engine control apparatus according to the fourth embodiment of the present invention, the coolant temperature storing means 36 stores the coolant temperature at the time when it is determined that the misfire state causing damage to the three-way catalyst 22 has arisen as the coolant temperature WT1 at the time of the determination that the damage-causing misfire state has arisen, and the coolant temperature change calculating means 37 calculates a change in coolant temperature from the coolant temperature WT1 at the time of the determination that the damage-causing misfire state has arisen. In the case where the coolant temperature WT1 at the time of the determination that the damage-causing misfire state has arisen is lower than the lower-limit coolant temperature WTc that is set as the low coolant temperature state, the fuel supply cutoff recovery means 33C outputs a drive permitting signal to the injector driving means 28 to make a recovery from the cutoff of the fuel supply when the rise in coolant temperature from the coolant temperature WT1 at the time of the determination that the damage-causing misfire state has arisen has become equal to or higher than the predetermined coolant temperature WT2 that is arbitrarily set in advance, and the misfire determining ratio JRn has become larger than the misfire ratio Rm at the time of the determination that the damage-causing misfire state has arisen.

Thus, when a misfire results from insufficient combustion or the like based on, for example, the use of low volatile fuel in a cold state, the recovery from the cutoff of the fuel supply is made after the temperature of the engine 1 has sufficiently risen. The volatility of fuel can thereby be increased, so the operation of the engine 1 can be resumed without causing a misfire. Therefore, the temperature of the three-way catalyst 22 can be prevented from rising abnormally, and the three-way catalyst 22 can be more reliably protected from being damaged.

Although the fuel supply cutoff recovery means determines, after the cutoff of the fuel supply has been started, whether or not the misfire determining ratio JRn is larger than the misfire ratio Rm at the time of the determination that the damage-causing misfire state has arisen in the foregoing third embodiment of the present invention and the foregoing fourth embodiment of the present invention, the present invention should not be limited thereto.

As described in the second embodiment of the present invention, the fuel supply cutoff recovery means may determine, after the cutoff of the fuel supply has been started, whether or not the corrected misfire determining ratio JRr for making a determination on recovery is larger than the misfire ratio Rm at the time of the determination that the damage-causing misfire state has arisen.

In these cases, the recovery from the cutoff of the fuel supply is not made immediately even if the operational state of the engine 1 changes, and the recovery from the cutoff of the fuel supply is made in a region having a sufficient margin with respect to the critical temperature TL. Therefore, unburnt fuel does not flow into the three-way catalyst 22 with the temperature thereof having reached the critical temperature TL, so the three-way catalyst 22 can be more reliably protected from being damaged.

What is claimed is:

1. An engine control apparatus comprising:
   a catalyst provided in an exhaust system of an engine, for purifying exhaust gas;
   various sensors provided in the engine;
   an operational state calculating means for calculating an operational state including at least an engine rotational speed and a filling efficiency based on outputs from the sensors;

a fuel injection amount calculating means for calculating a fuel injection amount of the engine based on the operational state;

an injector driving means for driving an injector for injecting fuel into an arbitrary one of cylinders in accordance with the fuel injection amount;

an actual misfire ratio calculating means for making a determination on presence/absence of a misfire and calculating an actual misfire ratio based on the outputs from the sensors;

a catalyst damage determining misfire ratio calculating means for calculating a misfire determining ratio for making a determination on a damage-causing misfire state in which the catalyst is assumed to be damaged, based on the operational state;

a catalyst damaging misfire determining means for comparing the actual misfire ratio with the misfire determining ratio and cutting off a supply of fuel to a misfired one of the cylinders when it is determined that the damage-causing misfire state has arisen;

a misfire ratio storing means for storing the actual misfire ratio at a time when it is determined that the damage-causing misfire state has arisen as a misfire ratio at a time of a determination that the damage-causing misfire state has arisen; and a fuel supply cutoff recovery means for outputting a drive permitting signal to the injector driving means to make a recovery from cutoff of a fuel supply when a predetermined condition is satisfied, wherein the fuel supply cutoff recovery means determines that the predetermined condition is satisfied when the misfire determining ratio has become larger than the misfire ratio at the time of the determination that the damage-causing misfire state has arisen.

2. An engine control apparatus according to claim 1, further comprising a misfire determining ratio correcting means for subtracting a predetermined misfire ratio from the misfire determining ratio.

3. An engine control apparatus according to claim 1, further comprising a catalyst temperature estimating means for estimating a temperature of the catalyst during normal combustion as an estimated catalyst temperature, wherein the sensors include an intake air amount measuring means for measuring an intake air amount of the engine, the catalyst temperature estimating means estimates the temperature of the catalyst during normal combustion as the estimated catalyst temperature based on outputs from the intake air amount measuring means and the fuel injection amount calculating means, and the fuel supply cutoff recovery means makes the recovery from the cutoff of the fuel supply when the estimated catalyst temperature is lower than a predetermined catalyst temperature.

4. An engine control apparatus according to claim 1, further comprising:

a coolant temperature storing means for storing a coolant temperature at a time when it is determined that the damage-causing misfire state has arisen as a coolant temperature at a time of a determination that the damage-causing misfire state has arisen; and a coolant temperature change calculating means for calculating a change in coolant temperature from the coolant temperature at the time of the determination that the damage-causing misfire state has arisen, wherein the sensors include a coolant temperature measuring means for measuring a coolant temperature of the engine, and the fuel supply cutoff recovery means makes the recovery from the cutoff of the fuel supply when the rise in coolant temperature from the coolant temperature at the time of the determination that the damage-causing misfire state has arisen has become equal to or higher than a predetermined coolant temperature in a case where the coolant temperature at the time of the determination that the damage-causing misfire state has arisen is lower than a predetermined lower-limit coolant temperature.

5. The engine control apparatus according to claim 1, wherein the actual misfire ratio is a ratio of a number of misfires to a predetermined number of times of operation of a spark plug.

6. The engine control apparatus according to claim 1, wherein the misfire determining ratio is calculated as a threshold at which a misfire begins to cause damage to the catalyst.

7. The engine control apparatus according to claim 1, wherein the misfire determining ratio decreases as the engine rotational speed and the filling efficiency increase as a result of a change in the operational state of the engine.

8. The engine control apparatus according to claim 1, wherein the injector driving means makes the recovery from cutoff by canceling the cutoff of the fuel supply.

9. The engine control apparatus according to claim 1, wherein the damage-causing misfire state has arisen when the actual misfire ratio is greater than the misfire determining ratio.

10. The engine control apparatus according to claim 1, wherein the misfire ratio is independent of the actual misfire ratio after the time when it is determined that the damage-causing misfire state has arisen and before a time at which the predetermined condition is satisfied.

11. An engine control apparatus comprising:

an actual misfire ratio calculating means for calculating an actual misfire ratio by determining presence of a misfire based on outputs from sensors provided in an engine;

a catalyst damage determining misfire ratio calculating means for calculating a misfire determining ratio, based on an operational state of the engine, said operational state being based upon an engine rotational speed and a filling efficiency determined by the sensors;

a catalyst damaging misfire determining means for comparing the actual misfire ratio with the misfire determining ratio and cutting off a fuel supply to a cylinder in which the misfire occurred when a determination is made that the actual misfire ratio is greater than the misfire determining ratio;

a misfire ratio storing means for storing a misfire ratio equivalent to the actual misfire ratio at a time when the determination is made that the actual misfire ratio is greater than the misfire determining ratio; and a fuel supply cutoff recovery means for outputting a drive permitting signal an injector driving means to cancel the cutoff of the fuel supply when the misfire determining ratio has become larger than the stored misfire ratio.

12. An engine control apparatus according to claim 11, further comprising a misfire determining ratio correcting means for subtracting a predetermined misfire ratio from the misfire determining ratio.

13. An engine control apparatus according to claim 11, further comprising:

a catalyst temperature estimating means for estimating a temperature of the catalyst during normal combustion as an estimated catalyst temperature, wherein the sensors comprise an intake air amount measuring means for measuring an intake air amount of the engine, wherein the catalyst temperature estimating means estimates the temperature of the catalyst during normal combustion as the estimated catalyst temperature based on outputs from the intake air amount measuring means and the fuel injection amount calculating means, and wherein the fuel supply cutoff recovery means cancels the cutoff of the fuel supply when the estimated catalyst temperature is lower than a predetermined catalyst temperature.

14. An engine control apparatus according to claim 11, further comprising:

a coolant temperature storing means for storing a coolant temperature at a time when it is determined that the damage-causing misfire state has arisen as a coolant temperature at a time of a determination that the damage-causing misfire state has arisen; and a coolant temperature change calculating means for calculating a change in coolant temperature from the coolant temperature at the time of the determination that the damage-causing misfire state has arisen, wherein the sensors comprise a coolant temperature measuring means for measuring a coolant temperature of the engine, and wherein the fuel supply cutoff recovery means cancels the cutoff of the fuel supply when the rise in coolant temperature from the coolant temperature at the time of the determination that the damage-causing misfire state has arisen has become equal to or higher than a predetermined coolant temperature in a case where the coolant temperature at the time of the determination that the damage-causing misfire state has arisen is lower than a predetermined lower-limit coolant temperature.

15. The engine control apparatus according to claim 11, wherein the actual misfire ratio is a ratio of a number of misfires to a predetermined number of times of operation of a spark plug.

16. The engine control apparatus according to claim 11, wherein the misfire determining ratio is calculated as a threshold at which a misfire begins to cause damage to the catalyst.

17. The engine control apparatus according to claim 11, wherein the misfire determining ratio decreases as the engine rotational speed and the filling efficiency increase as a result of a change in the operational state of the engine.

18. The engine control apparatus according to claim 11, wherein the misfire ratio is independent of the actual misfire ratio after the time when determined that the actual misfire ratio is greater than the misfire determining ratio and before a time at which the predetermined condition is satisfied.

19. An engine control method comprising:

calculating an actual misfire ratio by determining presence of a misfire based on outputs from sensors provided in an engine;

calculating a misfire determining ratio, based on an operational state of the engine, said operational state being based upon an engine rotational speed and a filling efficiency determined by the sensors;

comparing the actual misfire ratio with the misfire determining ratio and cutting off a fuel supply to a cylinder in which the misfire occurred when a determination is made that the actual misfire ratio is greater than the misfire determining ratio;

storing a misfire ratio equivalent to the actual misfire ratio at a time when the determination is made that the actual misfire ratio is greater than the misfire determining ratio; and outputting a drive permitting signal an injector driving means to cancel the cutoff of the fuel supply when the misfire determining ratio has become larger than the stored misfire ratio.

* * * * *